United States Patent [19]
Gamble et al.

[11] 3,775,139
[45] Nov. 27, 1973

[54] NON-FERROUS REFRACTORY COMPOSITION HAVING IMPROVED RESISTANCE TO MOLTEN NON-FERROUS METALS AND SLAGS

[75] Inventors: Elton S. Gamble, Trumbull; Warren S. Peterson, Guilford, both of Conn.

[73] Assignee: Olin Corporation, New Haven, Conn.

[22] Filed: Oct. 26, 1970

[21] Appl. No.: 84,122

Related U.S. Application Data

[63] Continuation-in-part of Ser. No. 674,634, Oct. 11, 1967, abandoned.

[52] U.S. Cl.................. 106/57, 106/44, 106/63, 106/65, 106/67, 106/66, 106/69
[51] Int. Cl............................................ C04b 35/48
[58] Field of Search.................. 106/57, 63, 65, 69, 106/85, 44, 67, 66

[56] References Cited
UNITED STATES PATENTS

| 2,589,157 | 3/1952 | Stalhane | 106/57 |
| 2,995,453 | 8/1961 | Noble et al. | 106/69 |
| 3,464,839 | 9/1969 | Gamble | 106/57 |

Primary Examiner—James E. Poer
Attorney—Gordon G. Menzies and Robert H. Bachman

[57] ABSTRACT

An inorganic refractory bonding material is provided for bonding refractory oxides or compounds to form refractory bodies having improved resistance to attack by molten nonferrous metals and slags, the bonding material contains a non-basic metallic oxide, or compound having a melting point above 2,500°F; metallic aluminum, zirconium oxide, or aluminum oxide; a bonding agent; and optionally a suspending agent, and a gelling agent.

9 Claims, No Drawings

NON-FERROUS REFRACTORY COMPOSITION HAVING IMPROVED RESISTANCE TO MOLTEN NON-FERROUS METALS AND SLAGS

DISCLOSURE

This application is a Continuation-In-Part of co-pending application Ser. No. 674,634, filed Oct. 11, 1967, now abandoned.

The predominant cause of failure and shortness of life of common refractory furnace linings in nonferrous melting and processing furnaces is attack and penetration of the lining by metal and/or metal oxides. The refractory aggregate of the refractory body, is generally more resistant to metal and metal oxide penetration and subsequent degradation, than is the bond portion. Therefore, if the bond is fortified in a way that renders it resistant to wetting by nonferrous metals and oxides, and highly stable towards metal and metal oxides, a superior refractory material is obtained.

In Gamble application Ser. No. 536,980, filed Mar. 24, 1966, now U.S. Pat. No. 3,464,839 a ceramic coating material is described which has been thoroughly tested in both molten copper and aluminum and their alloys. This material applied to metal and ceramic surfaces exposed to molten copper, and aluminum alloys resists wetting and attack by the molten metals to a high degree in commercial operations. It has effectively protected metal parts from attack by various copper alloys for prolonged periods of time and extended the service life of such metallic parts.

According to the present invention, the wetting resistance and other advantageous properties of the composition described in Ser. No. 536,980 are utilized by using a modification of the said composition as the bonding portion of refractory compositions suitable for forming into shapes and firing, and for placing in monolithic linings and firing in situ.

By using refractory grain or particles, suitably graded and properly proportioned, with the bonding composition of the present invention we obtain products with exceptional resistance to corrosive metal and metal oxides commonly encountered as slags in nonferrous processing. The bond thus formed has resistance to wetting that has been demonstrated which results in large part from the absence of any appreciable glassy phase in the composite.

In addition the product of the present invention may be used for ramming shapes, tamping and dry pressing.

It is thus an object of this invention to provide a refractory composition which is resistant to wetting and which is resistant to corrosive metal and metal oxides.

It is a further object of the present invention to provide a refractory composition which may be utilized for ramming of shapes, tamping and dry pressing.

The first component of the bonding composition of the present invention is from 30 to 55 parts by weight of a non basic and non-aggregate metallic oxide or compound having a particle size such that 97 percent will pass through a 200 mesh U.S. standard sieve and having a melting point above 2,500°F. The 30 to 55 parts by weight range is on a dry basis. By non-basic component it is intended to contemplate acidic or neutral metallic oxides or compounds having a melting point above 2,500°F. A preferred material is tricalcium phosphate, for example, commercial bone ash. Typical other materials which may be readily employed are, but not limited to, the following: silica; mullite; beryllium oxide, titanium oxide; fire clay; kaolinite; aluminum nitride; chromium oxide; bauxite; spinel; silicon carbide; titanium diboride; zirconium diboride; and so forth. This component acts as a filler of high refractoriness, and is generally resistant to attack by molten non-ferrous metals including copper and aluminum and their alloys and the slags commonly encountered in their processing. In general, the component resists wetting by non-ferrous metals. The refractory material is also compatible with the bonding agent. Naturally, the present invention contemplates the use of mixtures of any of the foregoing substances.

The second component is a finely divided non-aggregate material selected from the group consisting of aluminum, aluminum oxide, zirconium oxide, and mixtures thereof. This component is utilized in an amount up to 30 parts by weight based on a dry basis parts. In accordance with the present invention the aluminum powder is preferably utilized where the refractory is to contact copper or copper base alloys and the aluminum oxide is preferably utilized when the refractory is to contact aluminum or aluminum base alloys.

The aluminum powder is preferably the nonleafing, non-lubricated type of aluminum or aluminum alloy containing a minimum of 95 percent by weight of elemental aluminum. The aluminum powder particle size as well as the particle size of the aluminum oxide or zirconium oxide is such that 97 percent will pass through a 200 mesh U.S. standard sieve and the shape preferably spherical.

In addition to the foregoing constituents, the third component of composition of the present invention is a bonding agent such as aluminum phosphate or zirconium phosphate. The bonding agents contemplated must wihtstand high temperatures up to 2,500°F. Other such bonding agents may, of course, be employed provided they will withstand these high temperatures. In addition, the bonding agents to be used in this invention may contain, for example, small amounts of organic bonding agents. The refractory bonding agent is utilized in an amount from 15 to 50 parts by weight.

In addition to the foregoing constituents, one may optionally employ from 1 to 5 percent by weight of a suspending or thickening agent, such as kaolin. The purpose of kaolin is to keep the ingredients of the bonding composition in suspension. Otherwise, the ingredients would tend to settle on standing. The suspending agent should preferably be an acidic or neutral refractory material. For example, fire clay may be utilized. Alternatively, one might use an organic suspending agent, but is less preferred.

Another optional component is silica flour of at least —325 mesh U.S. standard sieve in an amount from 1 to 5 percent by weight. Alternatively, one may use any thixotropic or gelling agent preferably refractory in nature. This material acts as a control over the thixotropic or gelling properties of the bonding composition.

The preferred bonding composition of the present invention on a dry basis is as follows:

A. Bone Ash—$Ca_3(PO_4)_2$ —30 to 55 parts by weight. The preferred range is 40 to 50 parts by weight. For example, commercial bone ash of —325 mesh U.S. standard sieve 97 percent $CA_3(PO_4)_2$ minimum may be used.

B. Aluminum Powder - up to 30 parts by weight. The preferred range is 15 to 25 parts by weight. Part or all of the aluminum powder may be replaced by aluminum oxide, $Al_2O_3$ for applications in processing aluminum alloys.

C. Kaolin Clay - 1 to 6 parts by weight; preferred range 2 to 4 parts by weight.

D. Silica Flour, $SiO_2$ - up to 5 parts by weight; preferred range 2 to 4 parts by weight. For example, it can be −325 mesh U.S. standard sieve.

E. Aluminum Phosphate - Useful range of this bond former is 15 to 50 parts by weight. The preferred range is 20 to 35 parts by weight of the bonding material, exclusive of water additions.

The bonding composition of the present invention is used in the proportion of 1 part of the sum of the aforementioned requisite three components, as for example, items A, B, and E of the above prepared bonding composition, to 3 to 7 parts by weight of graded refractory grain as, for example, −4 + 170, and preferably −4 + 100, mesh U.S. standard sieve fused aluminum oxide The preferred ratio is approximately 1 part of the bonding composition to 4 parts of refractory grain, on a dry basis.

In addition to fused aluminum oxide grain, many other refractory aggregate bodies of −4 + 170, and preferably −4 + 100 mesh U.S. standard sieve may be compounded with the bonding composition of this invention and any properly graded aggregate from the group including mullite, sillimanite, fire clay grog, kyanite, silicon carbide, chromite, zirconia, graphite, silica and other amphoteric or acidic refractory compounds may be used. In the case of processing aluminum alloys silica should not be used.

The refractory composition of the present invention utilizes water. One should utilize from 4 to 6 percent by weight of all the dry components of water for dry pressing, 10 to 15 percent for tamping and from 5 to 9 percent for ramming shapes in order to provide the proper consistency.

The refractory composition including water, may then be applied, for example, to the inside surface of a non-ferrous processing vessel to form a lining.

In utilizing the bonding composition of the present invention one may premix the first component, the second component, the thixotropic agent, and the suspending agent. These constituents may then be stored for any desired period of time without degradation and loss in properties. The third component, e.g., aluminum phosphate, may then be added just prior to mixing the composition with the graded refractory grain. The aluminum phosphate may be prepared as an aqueous suspension, if desired, or the water may be added at the time of mixing the composition.

The refractory composition may be utilized as follows:

Mix all the dry ingredients including the graded refractory grain in a mixmuller or blender until uniformly mixed. Then, add the liquid aluminum phosphate, followed by a proper amount of tempering water to produce a suitable consistency for dry pressing, tamping or ramming shapes, as desired.

In general, the refractory composition of the present invention should be prepared by adding the liquid ingredients to the dry materials only just prior to use. The final slurry mixture cannot be stored for more than 20 hours without loss of bonding strength. As pointed out above, however, a mixture of the dry materials in the bonding composition may be prepared or stored indefinitely without any difficulty.

This invention may be embodied in other forms or carried out in other ways without departing from the spirit or essential characteristics thereof. This disclosure is therefore, to be considered as in all respects illustrative and not restrictive, the scope of the invention being indicated by the appended claims, and all changes which come within the meaning and range of equivalency are intended to be embraced therein.

What is claimed is:

1. A refractory composition for use with molten non-ferrous metals comprising:

A. from 30 to 55 parts by weight of a substance selected from the group consisting of tri-calcium phosphate, silica, mullite, beryllium oxide, titanium oxide, fire clay, kaolinite, aluminum nitride, chromium oxide, bauxite, spinel, silicon carbide, titanium diboride, zirconium diboride, and mixtures thereof, wherein said substance is of a particle size such that 97 percent will pass through a 200 mesh U.S. standard sieve, B. up to 30 parts by weight of a finely divided material selected from the group consisting of aluminum, aluminum oxide, zirconium oxide and mixtures thereof, wherein said material is of a particle size such that 97 percent will pass through a 200 mesh U.S. standard sieve, C. from 15 to 50 parts by weight of a refractory bonding agent capable of withstanding temperatures up to 2,500°F, and;

D. from 3 to 7 parts by weight of refractory aggregate of −4 + 170 mesh U.S. standard sieve for each 1 part of the sum of A, B and C.

2. A refractory composition according to claim 1 wherein said refractory aggregate is selected from the group consisting of aluminum oxide, mullite, sillimanite, fire clay grog, kyanite, silicon carbide, chromite, zirconia, graphite, silica, and mixtures thereof.

3. A refractory composition according to claim 1 in which said bonding agent is selected from the group consisting of aluminum phosphate and zirconium phosphate and mixtures thereof.

4. A refractory composition according to claim 1 including from 1 to 6 percent by weight of the combined weight of A, B and C of kaolin.

5. A refractory composition according to claim 1 including 1 to 5 parts by weight of silica flour of at least −325 mesh U.S. standard sieve.

6. A refractory composition according to claim 4 wherein said substance is present in an amount from 40 to 50 parts by weight.

7. A refractory composition according to claim 6 wherein said finely divided material is present in an amount from 15 to 25 parts by weight.

8. A refractory composition according to claim 6 wherein said bonding agent is present in an amount from 20 to 35 parts by weight.

9. A refractory composition for use with molten copper and copper base alloys as in claim 1 wherein said finely divided substance consists of aluminum.

* * * * *